Jan. 18, 1938.　　　　R. WAUNCH　　　　2,105,566
CUTTING BLOCK
Filed Oct. 29, 1934
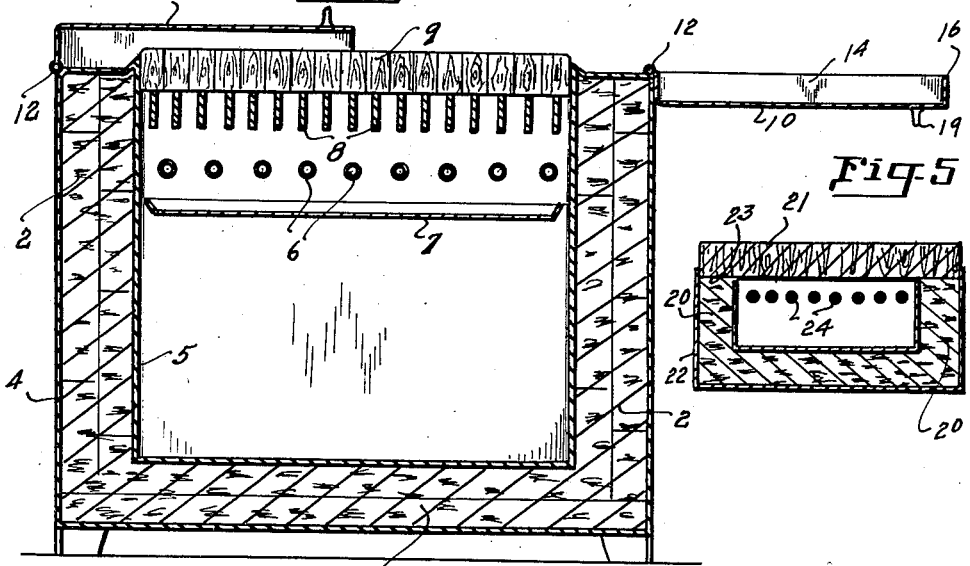
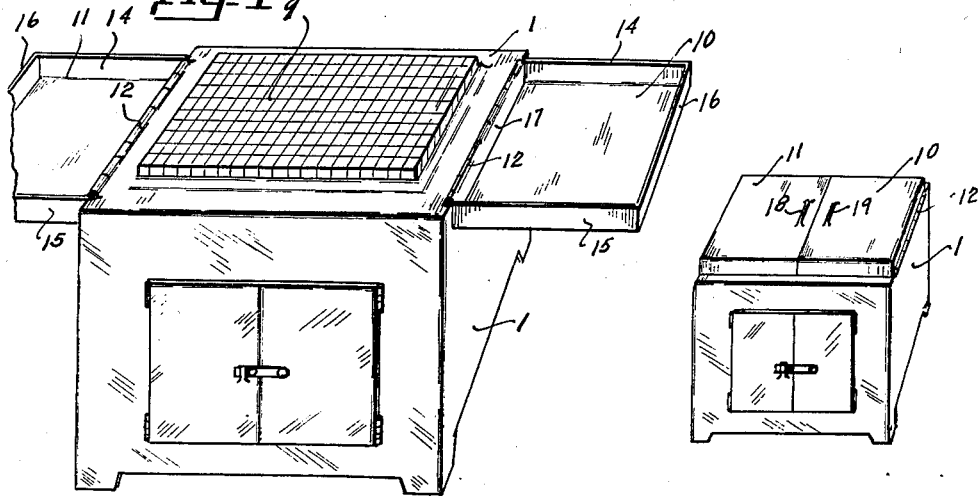
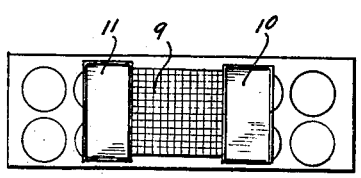
Inventor
Robert Waunch
By Thomas Riley
Attorney Patented Jan. 18, 1938

2,105,566

UNITED STATES PATENT OFFICE 2,105,566

CUTTING BLOCK

Robert Waunch, Salem, Oreg., assignor to Beauford B. Smith, Silverton, Oreg.

Application October 29, 1934, Serial No. 750,505

8 Claims. (Cl. 62—11)

My invention is comprised primarily and in preferred embodiment of a portable meat block having a coil of pipe disposed therein and through which a refrigerant may be circulated to thereby maintain the block in such a chilled condition that bacterial growth and development will be retarded, if not entirely prevented, upon and around the cutting surface of the block.

A further embodiment of my invention may comprise a meat block having a coil carrying a refrigerant disposed therebeneath that is encased within the confines of a cabinet upon which the meat block is disposed, the walls and bottom being insulated with the insulation being of greater insulating value than that of the block so that the leaking of the cold from the confines of the cabinet will pass through the meat block rather than the insulated walls of the container.

A still further embodiment of my invention may be so arranged that a portable cabinet is comprised of side and bottom walls that are suitably insulated and a meat cutting block be superposed above the cabinet in which the refrigerating coils are disposed so that the block and cabinet may be placed upon a counter or other display medium of a merchandising establishment for use in cutting meat or the displaying of other merchandise that is to be maintained in a cold or chilled condition.

A still further embodiment of my invention may be so made that hinged closures are provided for the meat cutting block the closures being rectangular in shape and hinged to the opposite sides of the block and being adapted to cover the block when the same are shut and being adapted for forming a container into which uncut and cut meat and other materials may be placed and supported during the treating and cutting process.

The primary purpose and object of my invention is to provide a meat block that may be maintained in a chilled or cold condition.

And a still further object of my invention consists in providing an insulated cabinet having a refrigerating coil disposed therein and having a meat cutting block superposed upon the cabinet so that the meat block may be maintained in such a chilled and refrigerated condition that bacterial development and growth will be retarded and prevented, on the face of the meat cutting block.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a perspective front view of the assembled device illustrating a hinged closure for the top side of the refrigerator unit and illustrating the hinged closure as being open.

Fig. 2 is a sectional front view of the assembled device.

Fig. 3 is a top plan view of the assembled device shown in use and in conjunction with a commercial refrigerator cabinet.

Fig. 4 is a perspective top front view of the device illustrated in Figs. 1 and 2.

Fig. 5 is a sectional front view of a modified form of device that is adapted to be used as a cutting block and for being placed upon a counter in a store.

Like reference characters refer to like parts throughout the several views.

In Figs. 1, 2, 3 and 4 I have shown a refrigerator cabinet 1 having insulated side and end walls 2 and having an insulated bottom 3. The insulating material is maintained in place and position and free from moisture by the same being encased between an exterior metal jacket 4 and an interior metal jacket 5. A plurality of refrigerant carrying coils 6 are disposed within and adjacent the top of the cabinet. A drip pan 7 is disposed within the cabinet and below the coils.

Any suitable grate 8 made of spaced members is disposed in the top of the container and upon this rests a fabricated meat cutting block 9. The heat insulating value of the meat cutting block 9 is less than the heat insulating value of the side, end and bottom walls of the container so that the cold temperature developed within the container will flow through the meat cutting block, since the cutting blocks will be dampened by the moisture within the chamber above the pan 7 and from the meat products above the block and thereby become poor insulators and good heat conductors. A closure for the meat cutting block is formed of hinged members 10 and 11. The hinged members are hingedly secured to the outer upper edges of the container as illustrated at 12 and 13. These lids form a closure, rectangular in shape and have a rim formed about their edges by right angularly extending end walls 14 and 15, outer side wall 16 and an inside side wall 17 to which the hinges are attached. These lids when open form containers into which the meat or other products being conditioned and treated may be deposited during the processing of the same by the butcher or other attendant. The lid members when folded form a top and form a chamber between the top of the block and the inner surface of the closures that will be normally maintained cool and within which materials to be kept in a semi-refrigerated state may be deposited. Suitable hinged and insulated doors, as shown in Fig. 1, furnish access to the interior of the cabinet 1, for placing articles to be refrigerated therein and for emptying the drip pan 7 as may be necessary.

Where a counter meat block is required the same may be made as illustrated in Fig. 5 and when so made the side and end walls 20 may be made relatively short and the meat cutting block 21 placed directly thereupon. The outside metal jacket 22 extends upwardly sufficiently from the top 23 of the side and end walls to form a positioner for the meat cutting block 21. The same may be made portable and have refrigerant carrying coils 24 placed immediately below the meat cutting block that have suitable connections as unions, not here shown, to directly connect the coils to a refrigerant carrying line that leads to a source of refrigerant not here shown.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a chest having side walls and a bottom wall, insulating material covering said side walls and bottom wall, a grid spanning the open top of the chest and spaced apart from the bottom wall and defining a chamber within the chest, refrigerating means disposed within the chamber, and a heat conducting cutting surface disposed above the grid.

2. In a device of the class described, the combination of a chest having insulated side walls and an insulated bottom wall, a heat conducting cutting surface spanning the open top of the chest and spaced apart from the bottom wall, refrigerating means disposed within the chamber, and means hingedly attached to the chest whereby the cutting surface may be housed, said last named means being adapted for positioning in a plane parallel to that defined by the cutting surface when the latter is exposed for use.

3. A new article of manufacture comprised of a fabricated heat conducting wooden top forming a meat cutting surface and means for regulating the temperature of the fabricated wooden top.

4. In a device of the class described, the combination of a container, the side walls and the bottom of the container being insulated, a refrigerating coil disposed within the container, means for conducting a refrigerating medium into the coils, a meat cutting block superposed upon the chamber and forming the top of the chamber, and said meat cutting block being made of a material that will permit the surface of the same being cooled by the low temperatures maintained in the chamber disposed therebelow.

5. In a device of the class described, the combination of a portable refrigerated chamber the top side of which is comprised of a meat block and the bottom side of the meat block being in communication with the refrigerated chamber and a closure for the top side of the meat block.

6. In a device of the class described, the combination of a refrigerating chamber, the side walls and the bottom being insulated, refrigerating coils disposed within the chamber that are in communication with a cooling supply medium, the top side of the chamber being formed of a meat cutting block.

7. In a device of the class described, the combination of a refrigerated meat block, a pair of hinged closures disposed at either side of the meat block, said hinged closures being rectangular and having side and end walls arranged so that when the closures are opened they will form containers disposed at the opposite sides of the block into which material may be placed and supported.

8. In a device of the class described, the combination of a refrigerated meat cutting block a hinged lidded closure adapted for covering the meat block when the lid is closed and for forming a meat holding container when the lid is opened.

ROBERT WAUNCH.